United States Patent [19]

Katayama et al.

[11] Patent Number: 5,680,376
[45] Date of Patent: Oct. 21, 1997

[54] OPTICAL RECORDING MEDIUM, AND APPARATUS AND METHOD FOR RECORDING AND REPRODUCING INFORMATION ON THE SAME

[75] Inventors: Hiroyuki Katayama; Junji Hirokane; Akira Takahashi, all of Nara; Kenji Ohta, Kitakatsuragi-gun, all of Japan

[73] Assignee: Sharp Kabushiki Kaisha, Osaka, Japan

[21] Appl. No.: 648,899

[22] Filed: May 16, 1996

Related U.S. Application Data

[62] Division of Ser. No. 217,434, Mar. 23, 1994, Pat. No. 5,544,149.

[30] Foreign Application Priority Data

Apr. 7, 1993 [JP] Japan .................................. 5-080567

[51] Int. Cl.$^6$ ........................................................ G11B 7/00
[52] U.S. Cl. ........................ 369/32; 369/47; 369/48; 369/58
[58] Field of Search ........................ 369/275.3, 275.2, 369/275.1, 32, 47, 48, 50, 54, 58, 59, 44.28, 44.37

[56] References Cited

U.S. PATENT DOCUMENTS

| 5,173,886 | 12/1992 | Satoh et al. ............... 369/275.3 X |
| 5,450,387 | 9/1995 | Uno et al. ............... 369/44.37 X |

FOREIGN PATENT DOCUMENTS

| 0 092 707 | 11/1983 | European Pat. Off. . |
| 0 478 201 | 4/1992 | European Pat. Off. . |
| 3741910 | 6/1988 | Germany . |

*Primary Examiner*—Muhammad N. Edun
*Attorney, Agent, or Firm*—David G. Conlin; William J. Daley, Jr.

[57] ABSTRACT

In an optical disk, since a header section has only one recording section for address information, the capacity of memory where a user can freely record data is increased. In an optical disk drive, four laser beams have a fixed positional relation. Based on the address information of a header section read out by at least one of the laser beams and the positional relation among the laser beams, the address information of tracks being scanned by the other laser beams is obtained. It is therefore possible to accurately record or reproduce information on the optical disk.

23 Claims, 5 Drawing Sheets

OPTICAL RECORDING MEDIUM, AND APPARATUS AND METHOD FOR RECORDING AND REPRODUCING INFORMATION ON THE SAME

This is a Divisional Application of application Ser. No. 08/217,434 filed Mar. 23, 1994, now U.S. Pat. No. 5,544,149.

FIELD OF THE INVENTION

The present invention relates to optical recording media such as an optical disk, an apparatus for recording and reproducing information on an optical recording medium, and a recording and reproducing method.

BACKGROUND OF THE INVENTION

Optical recording media such as an optical disk have been the focus of attention as high-density and large-capacity memory devices. There are various types of memory devices, including a ROM (read only memory) which can only be read, a WORM (write once read many times memory) that allows one writing action, and an EDRAW (erasable direct read after write) as erasable and rewritable memory. The optical recording media have a wide range of applications and are utilized by consumers and industry.

In order to achieve high speed access and durability against impact of movement, an optical recording medium has preformed grooves as guide tracks and preformed pit lines on the substrate thereof. The grooves as guide tracks are provided so that a focused laser beam is guided and scanned along a track. The pit lines are created to provide positional information (address information) on the optical recording medium. The guide tracks and the pit lines are generally called pre-formatted information sections, and are created when manufacturing the substrate of an optical recording medium.

The recording density of an optical recording medium is significantly higher than that of a portable-type magnetic recording medium such as a floppy disk. Accordingly, the optical recording medium is designed to prevent, particularly, defect and errors in a header section where address information is recorded.

Figure 5:
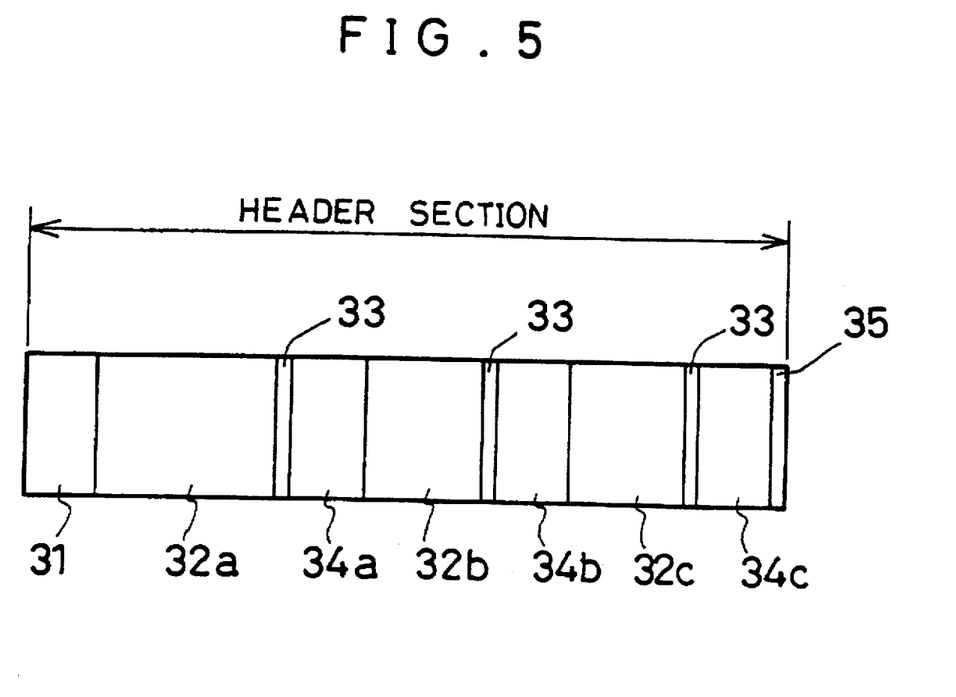
FIG. 5 is a view explaining a sector format of a conventional optical disk.

FIG. 5 shows a sector format, i.e., the structure of a header section of a rewritable optical disk cartridge for use in a calculator, according to ISO10089 (International Standardization Organization)/IEC (International Electrotechnical Commission) and X6271 of JIS (Japanese Industrial Standard).

A sector mark (SM) section 31 is provided for a detection of the beginning of the header section. A variable frequency oscillator (VFO) section 32a, a VFO section 32b, and a VFO section 32c are synchronization patterns provided for a detection of clock pulses used for demodulating a signal. Address mark (AM) sections 33 are provided to indicate the start of address information sections (hereinafter referred to as the ID sections) 34a to 34c. The ID (identification data) sections 34a to 34c include the same address information. A post-amble (PA) section 35 is provided to absorb an overflown demodulated channel bit string from the ID sections 34a to 34c.

As described above, in an optical disk cartridge, the same address information is recorded three times in the ID 34a to 34c and the address information is read out using a majority logic so as to prevent an erroneous detection of address information due to defect and errors in the header section.

Actually, an optical disk is sectored so that one complete rotation of the optical disk forms one track. Each track is divided into 17 sectors, and a header section shown in FIG. 5 is provided at the beginning of each sector. The optical disk having such a structure is reliable in practical use and allows the reproduction of address information.

On the contrary, with an optical disk having a conventional structure, since the header section occupies a large space of memory, a user area of the memory which is available for a user is decreased.

For example, in a 5-inch optical disk having 1024 bytes/sectors, there are 18750 tracks in total in one side of the optical disk, and each header section occupies 52 bytes. Therefore, the volume of data for the header sections becomes 52×17×18750=16,575 MB. This volume is equivalent to 5% of the total memory capacity of the optical disk, i.e., 1024×17×18750=326.4 MB.

Although an optical disk has a large capacity, an increased user area is demanded at present as the necessity of image data processing is increased. In order to consider the spread of multimedia in future, it is necessary to increase the user area of an optical disk even by a small amount. However, at present, as described above, since a large number of bytes are allocated for the header sections to improve the reliability of the optical disk, the capacity of the user area becomes smaller.

SUMMARY OF THE INVENTION

An object of the present invention is to provide an optical recording medium having an increased capacity of memory where a user can freely record data.

Another object of the present invention is to provide a recording and reproduction apparatus and a method for recording and reproducing information with accuracy on an optical recording medium which has a reduced volume of prerecorded address information and an increased capacity of memory where a user can freely record data.

In order to achieve the above object, an optical recording medium of the present invention includes a track having a plurality of sectors, each sector being divided into a header section where address information is recorded and a user-input-data recording section where a user can freely record data, the header section having only one address information section in which address information of each sector is recorded, wherein information is recorded or reproduced in a user-input-data recording section of a desired sector by reading the address information in the header section with light and accessing to the user-input-data recording section.

With this structure, since a header section has only one address information section, the memory capacity of the header section is significantly decreased. It is therefore possible to increase the memory capacity of the user-input-data recording section by an amount corresponding to the decrease in the memory capacity of the header section. Consequently, the capacity of memory in which the user can freely record data is increased.

In order to achieve another object, a recording and reproduction apparatus of the present invention includes: an optical recording medium having a track including a plurality of sectors, each sector being divided into a header section having only one address information section containing the address information of each sector and a user-input-data recording section where a user can freely record data; irradiating means for projecting a plurality of laser beams onto the optical recording medium; means for simultaneously recording or reproducing different information on a plurality of tracks by projecting a plurality of laser beams having a fixed positional relation onto he optical recording medium by the irradiating means; and means for obtaining the address information of tracks being scanned by the plurality of laser beams based on the address information of a header section read out by at least one of the laser beams and the positional relation among the plurality of laser beams.

With this structure, since the plurality of laser beams have the fixed positional relation, even when erroneous detection of the address information occurs due to defect and errors, if at least one of the laser beams reads out the address information of a header section, the address information of tracks being scanned by the other laser beams is obtained based on the positional relation among the plurality of laser beams. Thus, by decreasing the volume of prerecorded address information, information is accurately recorded or reproduced on/from an optical recording medium having an increased capacity of memory where a user can freely record data.

For a fuller understanding of the nature and advantages of the invention, reference should be made to the ensuing detailed description taken in conjunction with the accompanying drawings.

DESCRIPTION OF THE PREFERRED EMBODIMENTS

The following description discusses one embodiment of the present invention with reference to FIGS. 1(a), 1(b), and 2 to 4.

An optical disk (optical recording medium) 10 (see FIG. 3) of this embodiment has a plurality of concentric or spiral tracks. Information is recorded on and reproduction from the optical disk 10 by projecting laser beams onto tracks.

Figure 1A:
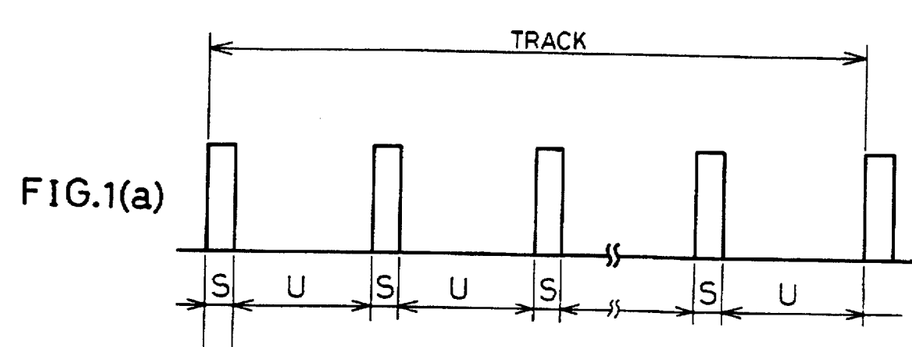
FIG. 1(a) is a view explaining a track format of an optical disk of the present invention.

Each track is divided into 17 sectors. As shown in FIG. 1(a), each sector is divided into a header section S and a user-input-data recording section U. The header section S contains prerecorded address information. A user can freely record data in the user-input-data recording section U. The number of sectors in one track is not particularly limited to seventeen.

Figure 1B:
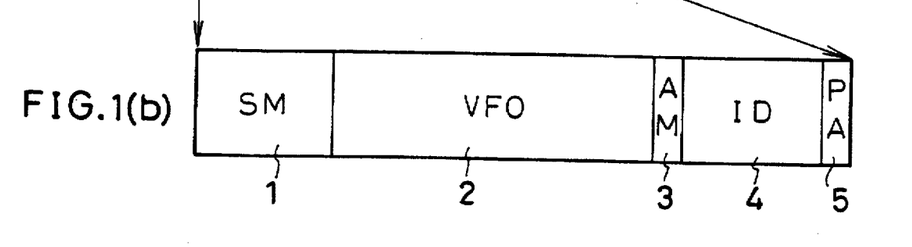
FIG. 1(b) is a view explaining a sector format of the optical disk.

As illustrated in FIG. 1(b), the header section S includes only one sector mark (SM) section 1, one variable frequency oscillator (VFO) section 2 as a synchronization pattern, one address mark (AM) section 3, one address information (ID) section 4, and one post-amble (PA) section 5. The ID section 4 is formed by a track address and a sector address.

The SM section 1 is provided for a detection of the beginning of the header section S. The VFO section 2 is provided for a detection of a clock pulse used for demodulating a signal. The AM section 3 is provided to indicate ehe beginning of the ID section 4. The ID section 4 includes a track address section and a section address section. The PA section 5 is provided to absorb an overflown modulated channel bit string from the ID section 4.

The number of bytes allocated for the header section S is 24. The numbers of bytes allocated for the SM section 1, VFO section 2, AM section 3, ID section 4 and PA section 5 are 5, 12, 1, 5, and 1, respectively.

Regarding a conventional optical disk, the header section includes three ID sections and three VFO sections. Thus, the number of bytes allocated for the header section is 52. The numbers of bytes allocated for the SM section, VFO section, AM section, ID section and PA section are 5, 28, 3, 15, and 1, respectively. Namely, the number of bytes allocated for the header section S on the optical disk 10 of this embodiment is 28 bytes less than the number of bytes allocated for the header section on the conventional optical disk.

The ID section 4 includes address information. More specifically, the ID section 4 includes a 2-byte track address, a 1-byte sector address, and a 16-bit (i.e., 2-byte) CRC (cyclic redundancy check) code.

The track address and the sector address are the information indicating the location of a sector containing the header section on the optical disk 10. The CRC code is an error detection code generated using a polynomial equation. When the CRC code is a 16-bit code, all the burst errors of less than 16 bits and random errors of less than 3 bits, and all the errors of odd-number bits are detectable.

In the optical disk 10 of this embodiment, since the header section S has one SM section 1, VFO section 2, AM section 3, ID section 4 and PA section 5, the memory capacity of the header section is considerably decreased in comparison with that of a conventional optical disk having a header section S including a plurality of SM section 1, VFO section 2, AM section 3, ID section 4 and PA section 5. It is thus possible o increase the memory capacity of the user-input-data recording section U of the optical disk 10 of this embodiment by an amount corresponding to the decrease in the memory capacity of the header section S.

For example, in an optical disk having 1024 bytes/sector, an outer diameter of 5 inches, a track pitch of 1.6 µm, and a user area excluding a system area with a length of 30 mm in a radial direction, the total memory capacity of the user-input-data recording section is around 9 MB larger than the total memory capacity of the user-input-data recording section of the conventional optical disk.

Namely, in the above-mentioned optical disk, since the number of tracks in the user area is 18750 (30 mm/1.6 µm), the total memory capacity of the header section S=24(bytes/header section)×17(sectors/track)×18750(tracks)=7.65 MB. On the other hand, in the conventional optical disk, the total memory capacity of the header section is 16.575 MB. Therefore, the total memory capacity of the user-input-data recording section U in the optical disk 10 of the present invention is around 9 MB larger than that of the user-input-data recording section of the conventional optical disk. The total memory capacity of the header section S (7.65 MB) is equivalent to about 2.34% of the total memory capacity of the optical disk (1024×17×18750=326.4 MB).

A conventional optical disk drive can be used to record and reproduce information on the optical disk 10 of this embodiment. However, as to be described hereinbelow, more favorable results are obtained if an optical disk drive (a recording and reproduction apparatus) with a multi-beam structure is used. Here, the information includes data prerecorded on the optical disk 10 as well as address information and data to be recorded in the user-input-data recording section U.

Figure 3:
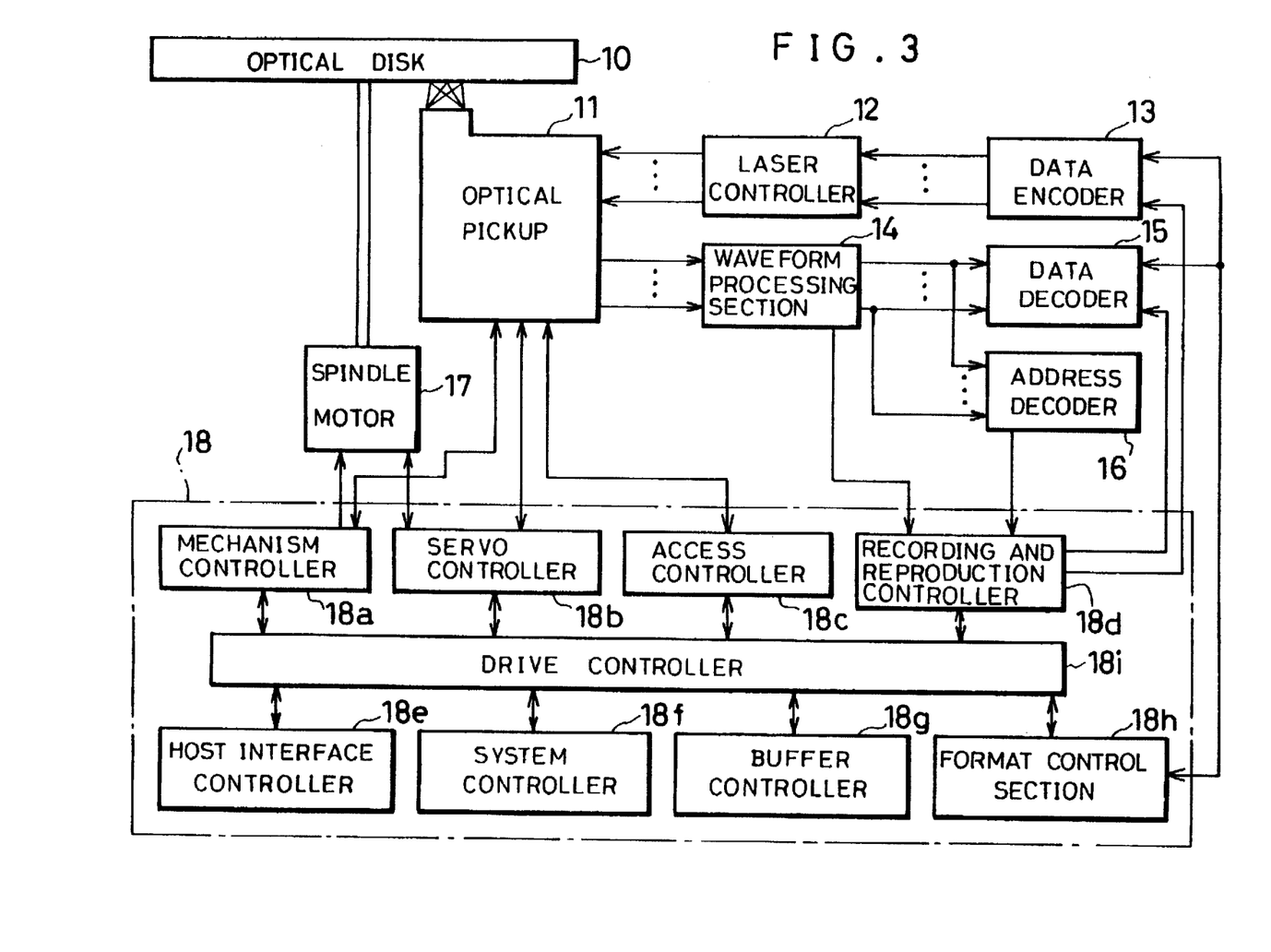
FIG. 3 is a block diagram showing essential components of the optical disk drive.

As illustrated in FIG. 3, an optical disk drive is formed mainly by an optical pickup (irradiating means) 11, a laser controller 12, a data encoder 13, a waveform processing section 14, a data decoder 15, an address decoder 16, a spindle motor 17, and a controller 18. The controller 18 includes a mechanism controller 18a, a servo controller 18b, an access controller 18c, a recording and reproduction controller 18d, a host interface controller 18e, a system controller 18f, a buffer controller 18g, a format control section 18h, and a drive controller 18i.

The optical pickup 11 records and reproduces information by projecting the laser beams 23a to 23d (see FIG. 2) onto the optical disk 10. The laser controller 12 transmits information from the data encoder 13 to the optical pickup 11, and controls the projection of the laser beams 23a to 23d from the optical pickup 11 in accordance with control signals from the servo controller 18b and the access controller 18c. The data encoder 13 processes information to be recorded on the optical disk 10 in a predetermined manner and transmits it to the laser controller 12.

The waveform processing section 14 process the waveform of the information reproduced by the optical pickup 11, and transmits the processed data to the data decoder 15 and the address decoder 16. The data decoder 15 extracts information other than address information, (for example, user-input data recorded in the user-input-data recording section U) from the information transmitted from the waveform processing section 14, and processes the extracted data in a predetermined manner. The address decoder 16 extracts the address information from the information sent from the waveform processing section 14, and processes the address information in a predetermined manner. The spindle motor 17 drives the optical disk 10 to rotate.

The controller 18 performs various control operations as follows. The drive controller 18i is an interface for connecting the controllers 18a to 18g and the format control section 18h. The mechanism controller 18a controls the mechanism of the optical pickup 11 and of the spindle motor 17. The servo controller 18b controls the optical pickup 11 and the spindle motor 17 by operating focus, racking and spindle servos. The access controller 18c controls the optical pickup 11 to access to the respective sectors of the optical disk 10. The recording and reproduction controller 18d controls the data encoder 13 and the data decoder 15. The waveform processing section 14 and the address decoder 16 transmits address information, and the recording and reproduction controller 18d transmits the address information to the respective controllers 18a to 18g through the drive controller 18i so that controlling operations are performed in accordance with the address information.

The host interface controller 18e is an interface which connects the main body of the controller 18 and the host controller, not shown, for controlling the entire optical disk drive. The system controller 18f controls the controllers 18a to 18g to smoothly perform the respective controlling operations. The system controller 18f has an arithmetic function to perform various calculations. The system controller 18f controls the controllers 18a to 18g so that different information is simultaneously recorded or reproduced on/from the tracks TR1 to TR4. Based on the address information in a header section S read out at least one of the laser beams 23a to 23d and the positional relation among the laser beams 23a to 23d, the address information of the tracks TR1 to TR4 scanned by other laser beams 23a to 23d is obtained by the system controller 18f.

The buffer controller 18g controls the memory device such as a RAM (random access memory), not shown, in the main body of the controller 18. The format control section 18h controls the data encoder 13 and the data decoder 15. The format control section 18h adds a header section S and an error correction code (ECC) to data input by a user, via the data encoder 13.

Figure 4:
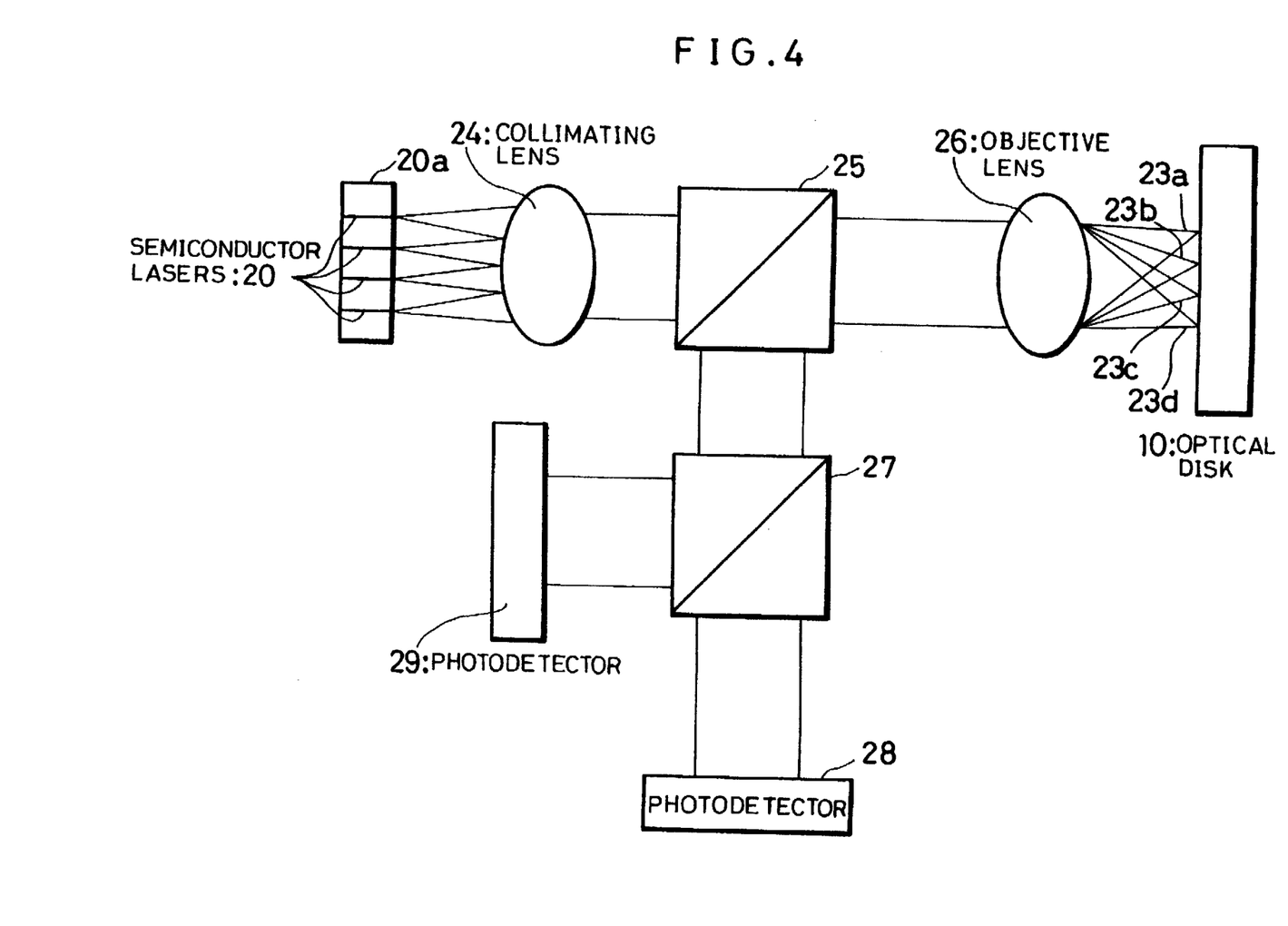
FIG. 4 is a block diagram showing a schematic structure of an optical pickup in the optical disk drive.

As illustrated in FIG. 4, the optical pickup 11 includes four semiconductor lasers 20, a collimating lens 24, a beam splitter 25, an objective lens 26, a beam splitter 27, and photodetectors 28 and 29.

The four semiconductor lasers 20 projects the laser beams 23a to 23d onto adjacent tracks TR1 to TR4 (see FIG. 2) on the optical disk 10 through the collimating lens 24, the beam splitter 25 and the objective lens 26. Namely, this optical disk drive has a structure using four beams. The semiconductor lasers 20 are mounted on predetermined locations to form a semiconductor laser array 20a, and their relative positions are fixed. Thus, the relative positions of the laser beams 23a to 23d are predetermined and can never change.

The collimating lens 24 converts the laser beams 23a to 23d from the semiconductor lasers 20 into parallel beams, and directs them toward the beam splitter 25. The parallel beams 23a to 23d incident on the beam splitter 25 go through the beam splitter 25. The beam splitter 25 reflects the laser beams reflected by the optical disk 10 toward the beam splitter 27. The objective lens 26 converges the laser beams 23a to 23d onto the optical disk 10.

The beam splitter 27 transmits a part of the intensity of the laser beams reflected by the optical disk 10, and causes it to fall on the photodetector 28. The beam splitter 27 also reflects the other part of the intensity of the laser beams reflected by the optical disk 10, and causes it to fall on the photodetector 29. The photodetector 28 detects error signals such as a focusing error signal and a tracking error signal. The error signals are then transmitted to the system controller 18f. The photodetector 29 detects information (for example, the address information recorded in the header section S and the user-input data recorded in the user-input-data recording section U). The information is then sent to the waveform processing section 14.

The following description discusses recording and reproduction of information on the optical disk 10 of this embodiment using the optical disk drive having the above-mentioned structure.

Figure 2:
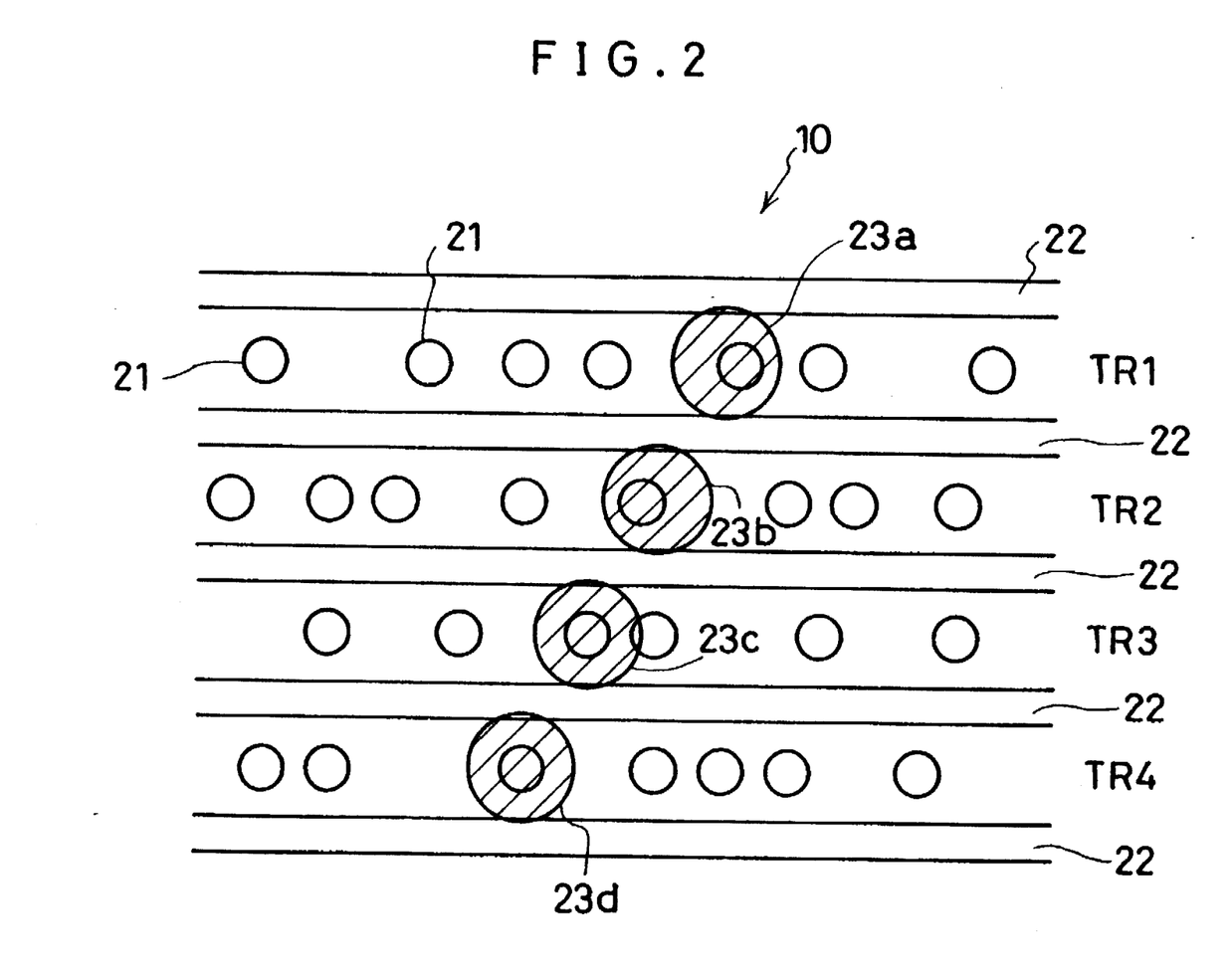
FIG. 2 is a view explaining a positional relationship between laser beams and tracks in an optical disk drive using four beams for recording or reproducing information on the optical disk.

As illustrated in FIG. 2, in an optical disk drive with a four-beam structure, four laser beams 23a to 23d are projected onto adjacent tracks TR1 to TR4 on the optical disk 10 to simultaneously record and/or reproduce information on a plurality of tracks TR1 to TR4.

The laser beams 23a to 23d are guided =o grooves as guide tracks 22 to scan the tracks TR1 to TR4 between the guide tracks 22. With the optical disk drive, by reading out the address information in a header section S formed by a pit line 21, the address information of the tracks TR1 to TR4 which are being scanned by the laser beams 23a to 23d is obtained.

In this optical disk drive, as described above, the relative positions of the four laser beams 23a to 23d are predetermined and can never change. Therefore, if the address information in a header section S of the tracks TR1 to TR4 being scanned by one of the laser beams 23a to 23d is read out, all the address information of the tracks TR1 to TR4 which are being scanned by the laser beams 23a to 23d is obtained based on the read out address information.

In short, in the optical disk drive of this embodiment, the four laser beams 23a to 23d have a fixed positional relation. Therefore, if the number of sector in each of the tracks TR1 to TR4 is known in advance, the controller 18 obtains the relation of all the address information of the tracks TR1 to TR4 by performing a simple calculation.

Namely, unless all the header sections S on the tracks TR1 to TR4 are defective, all the address information of the tracks TR1 to TR4 is obtainable.

Thus, the optical disk drive of this embodiment is capable of accurately recording and/or reproducing a large volume of data on the optical disk 10 of this embodiment. Moreover, with the structure of this optical disk drive, since the information is simultaneously recorded and/or reproduced on/from a plurality of tracks TR1 to TR4, a large volume of data is transmitted at high speeds.

In this embodiment, the optical disk 10 having the header section S formed by the SM section 1, VFO section 2, AM section 3, ID section 4, and PA section 5 is discussed. However, it is not necessarily to restrict the structure of the header section S of the optical disk of the present invention to the above-mentioned structure. Additionally, the number of byte allocated for each of the header section S, SM section 1, VF0 section 2, AM section 3, ID section 4, and PA section 5 is not particularly restricted to the figure mentioned above. Namely, in the optical disk 10 of the present invention, the header section S needs to have only one recording section (ID section 4) for the address information.

The information of the header section S is recorded in a desired manner if it is readable with light. For example, the information of the header section S is recorded in the form of pit lines 21. It is also possible to record the information of the header section S in the form of magnetic domain patterns as like on a magneto-optical recording medium, or in the form of arrays of crystalline phase and amorphous phase as like on a phase change type medium.

In the above-mentioned embodiment, the optical disk 10 is taken as an example of optical recording media. However, the present invention is also applicable to an optical card and an optical tape.

Also, although the optical disk drive with four-beam structure is discussed in the above-mentioned embodiment, the present invention is applicable to an optical disk drive with N-beam structure, N representing a natural number not less than 2. With the N-beam structure, unless all the header sections S of the N-number tracks get damaged, the address information of all the tracks is obtainable. More specifically, in the optical disk drive with N-beam structure, as N becomes larger, the accuracy of reading out the address information is improved. In other words, as N becomes larger, the reliability of the optical disk drive is increased.

The N-number laser beams are positioned in a desired manner as long as the laser beams have a fixed positional relation. For example, the laser beams are positioned so that they are projected onto adjacent tracks as described above or onto every other track. The laser beams may also be projected onto tracks so that the number of unexposed tracks between the laser beams varies.

In the above-mentioned embodiment, the optical disk drive is discussed as an example of the recording and reproduction apparatus. However, the present invention is also applicable to an optical card drive and an optical tape drive.

As described above, each track on the optical disk 10 of this embodiment is divided into a plurality of sectors. Each sector is further divided into the header section S and the user-input-data recording section U. By reading the address information in a header section S with light, the user-input-data recording section U in a desired sector is accessed, and information is recorded on or reproduced from the user-input data recording section U. The optical disk 10 of this embodiment is characterized by that the header section S includes only one recording section for the address information.

Accordingly, the memory capacity of the header section S is significantly decreased. Consequently, in the optical disk 10 of this embodiment, the memory capacity of the user-input-data recording section U is increased by an amount corresponding to the decrease in the memory capacity of the header section S. It is thus possible to increase the capacity of memory where the user can freely record data.

As described above, the optical disk drive having the four-beam structure according to this embodiment includes the system controller 18f for simultaneously recording or reproducing different information on a plurality of tracks TR1 to TR4 on the optical disk 10 of this embodiment by projecting the four laser beams 23a to 23d. In this optical disk drive, the four laser beams 23a to 23d have a fixed positional relation. The optical disk drive of this embodiment is characterized by the system controller 18f which obtains the address information of the tracks TR1 TR4 being scanned by the laser beams 23a to 23d based on the address information of a header section S read out by at least one of the laser beams 23a to 23d and the positional relation among the laser beams 23a to 23d.

Therefore, even when an erroneous detection of the address information occurs due to defect or errors, if address information of a header section S is read out by one of the laser beams 23a to 23d, the address information of the tracks TR1 to TR4 being scanned by the other laser beams 23a to 23d is obtained. Thus, by decreasing the volume of prerecorded address information, information is accurately recorded on or reproduced from an optical disk 10 having an increased capacity of memory in which the user can freely record data.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A recording and reproduction apparatus comprising:
    an optical recording medium having a track including a plurality of sectors, each sector being divided into a header section where address information is recorded and a user-input-data recording section where a user freely records data, the header section including only one address information section where address information of each sector is recorded;
    irradiating means for projecting a plurality of laser beams on said optical recording medium;
    means for simultaneously recording or reproducing different information on a plurality of tracks by projecting a plurality of laser beams having a fixed positional relation onto said recording medium by irradiating means; and
    means for obtaining address information of tracks being scanned by the plurality of laser beams based on address information in a header section read out with at least one of the laser beams and the positional relation among the plurality of laser beams.

2. The recording and reproduction apparatus according to claim 1,
wherein the address information section on said optical recording medium comprises an identification data section including allocation information of tracks on said optical recording medium and allocation information of sectors of the tracks.

3. The recording and reproduction apparatus according to claim 1,
wherein the header information further includes only one address mark section indicating a start of the address information section.

4. The recording and reproduction apparatus according to claim 1,
wherein the header section further includes only one variable frequency oscillator section for detecting a clock pulse used for demodulating a signal.

5. The recording and reproduction apparatus according to claim 1,
wherein the header section further includes a sector mark section indicating a start of the header section, and a post-amble section set for absorbing overflown demodulated data from the address information section.

6. The recording and reproduction apparatus according to claim 1,
wherein the header section includes a sector mark section, a variable frequency oscillator section, an address mark section, an identification data section formed by a track address section and a sector address section, and a post-amble section.

7. The recording and reproduction apparatus according to claim 1,
wherein the header section includes only one sector mark section, one variable frequency oscillator section, one address mark section, one identification data section formed by a track address section and a sector address section, and one post-amble section.

8. The recording and reproduction apparatus according to claim 1, wherein the information to be simultaneously recorded or reproduced on said plurality of tracks is address information and/or user data.

9. A recording and reproducing method comprising:
the step of projecting a plurality of laser beams having a fixed positional relation onto an optical recording medium having a track including a plurality of sectors by irradiating means, each sector being divided into a header section where address information is recorded and a user-input-data recording section where a user freely records data, the header section including only one address information section where address information of each sector is recorded; and
the step of obtaining address information of tracks being scanned by the plurality of laser beams based on address information of a header section read out by at least one of the plurality of laser beams and the positional relation among the plurality of laser beams.

10. The recording and reproducing method according to claim 9, further comprising the steps of simultaneously recording or reproducing different information on the plurality of tracks based on the obtained address information.

11. The recording and reproducing method according to claim 9, further comprising the steps of simultaneously recording and reproducing different information on the plurality of tracks based on the obtained address information.

12. The recording and reproducing method according to claim 9,
wherein the plurality of laser beams are projected onto adjacent tracks on said optical recording medium.

13. The recording and reproducing method according to claim 9,
wherein the plurality of laser beams are projected onto every other track on said optical recording medium.

14. The recording and reproducing method according to claim 9,
wherein the plurality of laser beams are projected onto tracks on said optical recording medium so that the number of unexposed tracks between the laser beams varies.

15. A reproduction apparatus comprising:
an optical recording medium having a track including a plurality of sectors, each sector being divided into a header section where address information is recorded and a user-input-data recording section where a user freely records data, the header section including only one address information section where address information of each sector is recorded;
irradiating means for projecting a plurality of laser beams on said optical recording medium;
means for simultaneously reproducing different information on a plurality of tracks by projecting a plurality of laser beams having a fixed positional relation onto said recording medium by said irradiating means; and
means for obtaining address information of tracks being scanned by the plurality of laser beams based on address information in a header section read out with at least one of the laser beams and the positional relation among the plurality of laser beams.

16. The reproduction apparatus according to claim 15, wherein the address information section on said optical recording medium comprises an identification data section including allocation information of tracks on said optical recording medium and allocation information of sectors of the tracks.

17. The reproduction apparatus according to claim 15, wherein the header section further includes only one address mark section indicating a start of the address information section.

18. The reproduction apparatus according to claim 15, wherein the header section further includes only one variable frequency oscillator section for detecting a clock pulse used for demodulating a signal.

19. The reproduction apparatus according to claim 15, wherein the header section further includes a sector mark section indicating a start of the header section, and a post-amble section set for absorbing overflown demodulated data from the address information section.

20. The reproduction apparatus according to claim 15, wherein the header section includes a sector mark section, a variable frequency oscillator section, an address mark section, an identification data section formed by a track address section and a sector address section, and a post-amble section.

21. The reproduction apparatus according to claim 15, wherein the header section includes only one sector mark section, one variable frequency oscillator section, one address mark section, one identification data section formed by a track address section and a sector address section, and one post-amble section.

22. A recording and reproduction apparatus comprising:
irradiating means for projecting a plurality of laser beams on an optical recording medium;
means for simultaneously recording or reproducing different information on a plurality of tracks by projecting a plurality of laser beams having a fixed positional relation onto said optical recording medium by said irradiating means; and means for obtaining address information of tracks being scanned by the plurality of laser beams based on address information in a header section read out with at least one of the laser beams and the positional relation among the plurality of laser beams.

23. A reproduction apparatus comprising:

irradiating means for projecting a plurality of laser beams on an optical recording medium;

means for simultaneously reproducing different information on a plurality of tracks by projecting a plurality of laser beams having a fixed positional relation onto said optical recording medium by said irradiating means; and means for obtaining address information of tracks being scanned by the plurality of laser beams based on address information in a header section read out with at least one of the laser beams and the positional relation among the plurality of laser beams.

* * * * *